AIR CONDITIONING UNITS

Original Filed Dec. 10, 1965

INVENTOR.
ARTHUR C. O'HARA.
BY Robert F. Ruemeli
ATTORNEY.

United States Patent Office

Re. 26,679
Reissued Oct. 7, 1969

26,679

AIR CONDITIONING UNITS

Arthur C. O'Hara, Syracuse, N.Y., by Carrier Corporation, assignee, Syracuse, N.Y., a corporation of Delaware Original No. 3,397,740, dated Aug. 20, 1968, Ser. No. 512,951, Dec. 10, 1965. Application for reissue Oct. 24, 1968, Ser. No. 791,812
Int. Cl. F28f *13/12*
U.S. Cl. 165—123 2 Claims

Matter enclosed in heavy brackets [ ] appears in the original patent but forms no part of this reissue specification; matter printed in italics indicates the additions made by reissue.

ABSTRACT OF THE DISCLOSURE

An induction type room terminal for use in an air conditioning system employing an improved bypass damper utilizing spring means to bias the damper open and serve as the hinge therefor.

Figure 1:
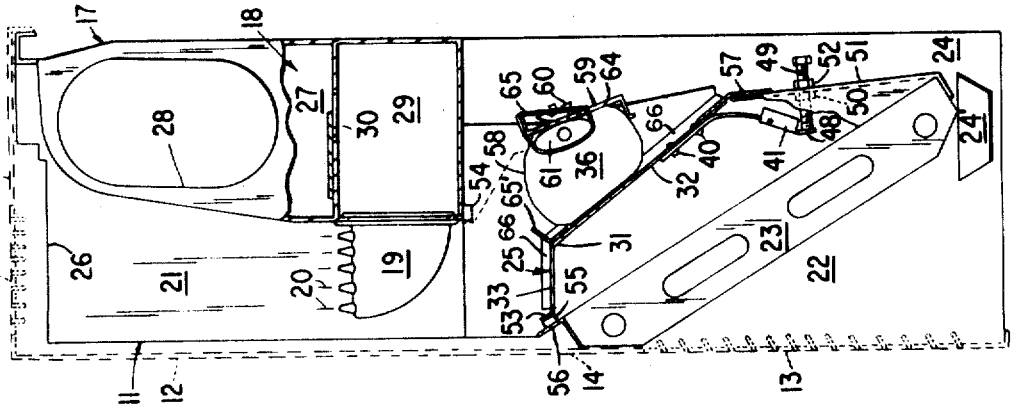

This invention relates to air conditioning units and, more particularly, to an air conditioning unit including an improved damper assembly.

The invention is illustrated in an induction type room terminal in which jet streams of high kinetic energy primary air induce secondary air from a room upwardly through a passage including a heat exchanger coil for heating or cooling the secondary air. A novel by-pass damper assembly is associated with the passage for regulating the flow of the secondary air through the coil. From the passage the mixture of primary and secondary air is discharged into the room.

A central air conditioning installation often requires a great number of room terminals installed throughout the building. Numerous considerations may influence the choice of a particular type of room terminal for an installation. Such consideration may include initial cost, operating cost and characteristics, reliability and service. Initial cost generally includes manufacturing, shipping, and installation costs of the air conditioning equipment. Light weight and simplicity of design as well as ease of production line assembly of the equipment are important factors reflected in initial cost. However, optimization of these factors is difficult because a room terminal must be sufficiently sturdy to withstand shipping and handling without damage or disturbance of its factory adjustments. Operating costs and characteristics concern the aerodynamic and thermodynamic aspects of the design and deter indiscriminate simplification and cost reductions in the unit. Reliability and ease of service after installation are often controlling deterrents in applying expedients which would reduce initial cost and simplify production line assembly of the equipment. While various expedients common in mechanical, thermodynamic and aerodynamic arts might seem obviously appropriate for use in air conditioning equipment, the various previously discussed factors in many instances have prevented the adoption of such expedients in commercial room terminal base units.

It is a primary object of this invention to provide a new and improved air conditioning unit and, more particularly, a room terminal base unit including an improved damper assembly. Another related object is provision in such a unit including a casing providing a passage for air and a damper for regulating flow of the air and including operating means including a spring providing a hinge connection between a damper blade and the casing, the spring mounting the damper blade for swinging movement in the passage between open and closed positions and adjustably urging the damper blade toward one of these positions, and actuating means for urging the damper blade to the other position.

The invention is, in brief, illustrated in an induction type room terminal base unit having a damper assembly which includes a damper blade mounted on leaf-springs for modulated swinging movement between closed and open positions to vary the proportion of secondary air passing in heat exchange relationship with a coil and by-passing the coil. The springs urge the blade toward the open position and maintain it operatively aligned in the base unit. An expansible actuator urges the damper toward the closed position.

Figure 2:
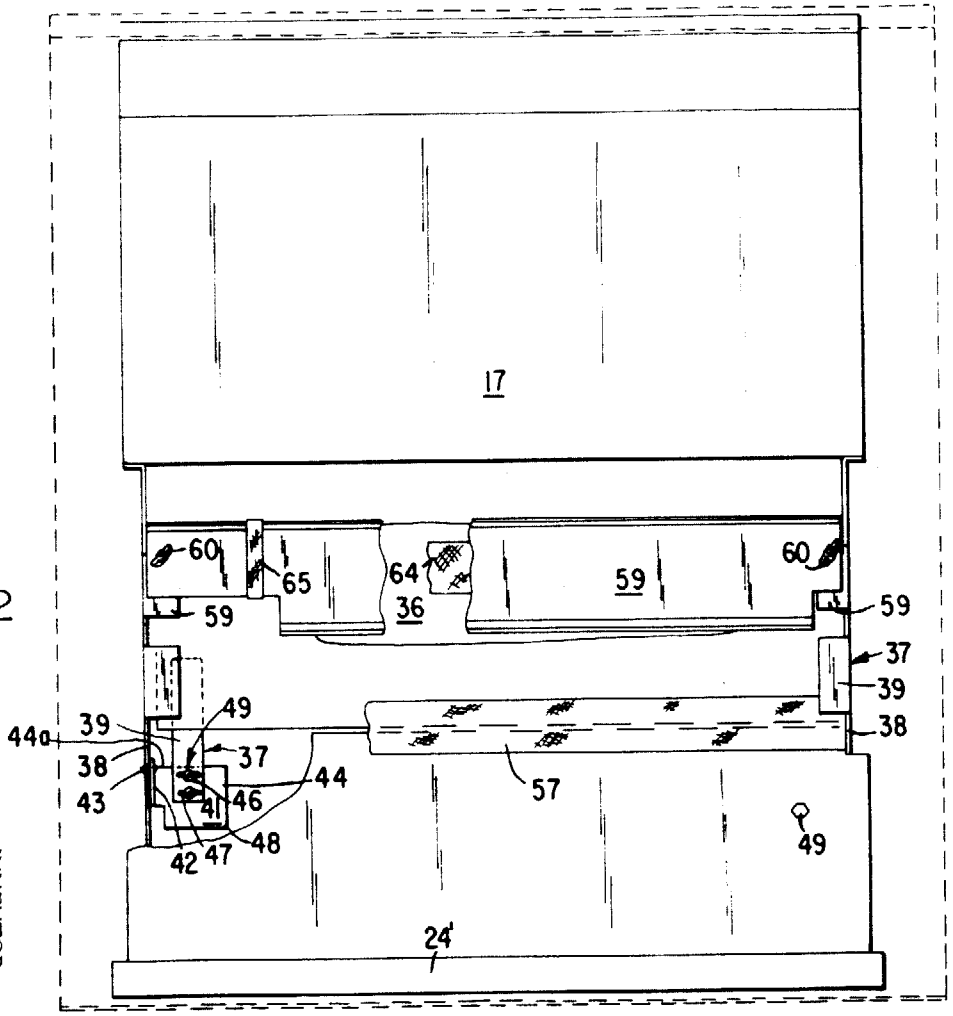

These and other objects and advantages of the invention will be apparent from the following description and the accompanying drawing in which:

FIGURE 1 is a sectional, end elevational view of a vertical induction type room terminal base unit within a cabinet; and FIGURE 2 is a fragmentary rear view of a lower portion of the unit shown in FIGURE 1, with parts broken away and removed for clearer illustration.

Referring to the drawing, an induction type room terminal base unit 11 is mounted in a cabinet 12. The cabinet includes a secondary air inlet 13 in the lower portion of a front panel 14 and an air outlet 15 in a top panel 16. The base unit 11 includes a casing 17 with a plenum 18 from which primary air is discharged through horizontally spaced apart nozzles 19 which provide high kinetic energy jet streams 20 of primary air passing upwardly in a generally vertical passage 21 formed by the cabinet 12 and the casing 17 to induce the flow of secondary air through the passage 21. From the cabinet inlet 13 the secondary air passes to a base unit inlet portion 22 formed by an inclined heat exchanger coil 23 facing the cabinet inlet 13 and mounted at the bottom of the front of the base unit 11, and a by-pass inlet 24 at the bottom of the rear of the base unit opposite the coil 23. The flow of the secondary air through the coil 23 and the by-pass inlet 24 is regulated by a damper assembly 25 mounted on the casing 17. The mixture of primary and secondary air is discharged into the room through the cabinet outlet 15 which communicates with a base unit outlet 26 at the upper end of the passage 21.

The plenum 18 has an upper chamber 27 with opening 28 at either end for connection with plenums of other base units. A lower chamber 29 of the plenum 18 is separated from the upper chamber 27 by an adjustable damper 30 so that a desired static pressure may be assured in the lower chamber 29 for providing a desired flow rate of primary air through the nozzles 19 which are mounted on the plenum 18 in communication with the lower chamber 29.

The damper assembly 25 includes a damper blade 31 having a generally upright body 32 with a generally horizontal flange 33 at its upper end. The blade 31 may be modulated between closed and full open positions. In closed position the damper blade 31 prevents the passage of secondary air through the coil [25] *23* and all the secondary air passes about a coil drip pan 24' and through the by-pass inlet 24 at the rear of the casing 17, so that the temperature of this secondary air is substantially unaffected by the coil [25] *23*. In the full open position, as indicated by dotted lines in FIGURE 1, the damper blade 31 prevents the flow of secondary air through the by-pass inlet 24 and all of the secondary air flows through the coil 23. Modulation of the damper blade 31 between these positions is provided by operating means including a pneumatic actuator 36 which closes the damper, and spring means (FIGURE 2) which open the damper and mount the blade for swinging movement in the passage 21 between its closed and full open positions.

The spring means mounting the damper blade 31 on the casing 17 includes a pair of adjustable spring assemblies 37, one at either end of the damper blade 31 and adjacent casing end wall 38. The spring assemblies 37 are identical, and each includes a leaf spring 39 adjustably mounted at a first or lower end on the casing and at a second or upper end fixed in facial engagement with the front of the damper blade body 32 in any suitable manner as by rivets 40. The adjustable mounting of the spring 39 on the casing 17 includes a rigid metal angle bracket 41 having a flange 42 pivoted to the adjacent end casing wall 38 as by a rivet 43. Another flange 44 of the bracket 41 has an upper edge 44a (FIGURE 2) generally level with the rivet axis and a pair of vertically aligned threaded apertures. Bolts 46 (FIGURE 2) pass through upper and lower horizontally elongated slots 47 in the lower end portion of the spring 39 and are threadedly received in the apertures for adjusting the position of the damper blade 31 transversely of the casing end walls 38 and for securing the adjusted spring in tight facial engagement with the bracket flange 44, and extending upwardly from the flange edge.

In order to adjust the opening force which the springs 39 apply to the damper 31, each bracket 41 has a tab 48 which extends downwardly from the bracket flange 44 to which the spring 39 is secured and the tab is positioned for engagement by an adjusting screw, here in the form of a bolt 49 in threaded engagement with a nut 50 fixedly secured to the inner face of a rear panel 51 of the casing. The bolt 50 is held in adjusted position by a lock nut 52 on the outer face of the rear panel 51. By screwing the adjusting bolt 49 inwardly the opening force of its associated spring 39 is increased and the deflection of the spring 39 is increased, thereby decreasing its chord length from the bracket edge 44a to the damper blade. However, the bracket edge 44a is simultaneously moved upwardly to maintain substantially the same length lever arm with the position of the damper upper end unchanged. Thus, by adjusting the two adjusting screws 49, the front edge 53 of the open damper blade flange 33 may be caused to seat evenly on a polyurethane sealing strip 54 adhesively secured to the underside of the plenum 18, and against a similar strip 55 adhesively secured to a front panel 56 of the casing above the coil 23, in closed position of the damper.

The spring mounts 37 maintain the damper blade 31 properly aligned in the casing and are adjustable for varying the operation of the damper and the force with which it is urged to its full open position against the sealing strip 54. A gap between the bottom horizontal edge of the damper blade 31 and the top edge of the rear panel 51 of the casing 17 may be closed by a suitable one side adhesive tape 57 secured along opposite edge portions of the rear faces of the rear panel 51 and the damper blade body 32. The adhesively coated portion of the tape exposed between the blade and the rear panel may be coated with talc or otherwise suitably treated to destroy its adhesive quality.

The pneumatic actuator 36 includes a balloon 58 of suitable flexible plastic material mounted on a plate 59 removably secured at either end to casing end wall flanges 59 as by studs and wing nuts 60. The balloon 58 is positioned between the plate 59 and the rear face of the damper blade body 32. A generally oval connector 61 is attached to a reduced neck portion of one end of the balloon 58 for connection with a suitable source of control air for modulating inflation of the balloon 58 to regulate the positioning of the damper blade 31 and therefore the proportion of secondary air passing through the coil 23 and by-passing the coil through the by-pass inlet 24. When the balloon 58 is deflated it is flat. The rear flat face is preferably adhesively secured in facial relationship with the mounting plate 59, for example by two side adhesive tape 64 and by similar one side adhesive tape 65 about the connector 61 and the plate 59, as may best be seen in FIGURE 2.

When fully inflated the balloon is not substantially stretched but its shape is changed and a large area of the front face of the balloon 58 is substantially stationary and engages the rear face of the damper blade without appreciable slippage. The balloon is generally flat against the rear face of the damper blade 32 and urges the upper horizontal edge 53 of the blade flange 33 into sealing engagement with the sealing strip 55. A large area of contact between the balloon 58 and the damper blade 31, and a relatively long lever arm provided by the spring mountings 37 to the center of this area of contact provides for smooth damper action.

With particular reference to FIGURE 1, it will be seen that foreign matter could fall through the air outlet 15, 26 at the upper end of the passage 21 and against the balloon 58 when the damper blade 31 is closed. To eliminate this possibility, a balloon shield 65' is provided on the upper portion of the damper blade body 32. This shield 65' may be of any suitable material such as sheet metal or preferably an adhesive aluminum tape secured to the damper blade and extending upwardly therefrom to prevent any foreign matter falling through the air outlet from contacting the balloon.

It should be noted that the present construction is not subject to wear in the regions of the mounting of the damper blade on the casing since in normal operation of the damper assembly there are no parts running on each other. When the spring adjusting bolts 46 are tightened, the damper blade is retained in operative alignment. Sealing strips 66 such as polyurethane foam along opposite end edge portions of the blade 31 are opposed to the adjacent casing end walls 38 to prevent the passage of air between the damper ends and the casing walls.

The pneumatic actuator assembly 36 is installed after the damper blade 31 is in place and does not require precise alignment. The aerodynamic and thermodynamic characteristics of the base unit are substantially unaffected by the improved damper assembly and more positive seating of the damper against the sealing strips 54 and 55 in the closed and full open positions is assured by the spring adjusting screws 49 for independently adjusting the opposite ends of the damper blade. Because the spring mountings are devoid of any parts which run against other parts, field maintenance is practically eliminated, and the construction and placement of the balloon actuator is such that substantially no rubbing occurs between the balloon and the damper or its mounting plate.

While a preferred embodiment of this invention has been described and illustrated, it should be understood that the invention is not limited thereto but may be otherwise embodied within the scope of the following claims.

I claim:

1. An air conditioning unit comprising:

a casing having an inlet and outlet therein, a plenum chamber disposed in said casing adapted for connection to a source of supply air, a heat exchanger disposed in said casing adapted for connection to a source of heat exchange medium, discharge means communicating with said plenum chamber for discharging supply air into said casing to induce secondary air from the area being conditioned through the inlet to mix with supply air, the mixture being discharged through the casing outlet, a damper disposed in said casing operably movable between an open and a closed position for regulating the amount of air flowing through or bypassing the heat exchanger, brackets pivotally mounted on said casing, spring means connected to said damper and said brackets, said spring means locating said damper in said casing, serving as a hinge therefor, and biasing said damper toward open position, [and]

*expansible means for biasing said damper toward closed position, and* spring tensioning means for engagement with said brackets for adjusting the pivoted position of said brackets to vary the tension on said spring means for regulating the bias said damper exerts against said expansible means.

2. An air conditioning unit according to claim 1 wherein said spring means includes a plurality of leaf springs, one end of each of said springs being affixed to said damper, the other end of said springs being adjustably secured to said brackets, said spring tensioning means including screws, fixed to said casing for engagement against said brackets to adjust the pivoted position thereof for varying the deflection of said springs.

References Cited

The following references, cited by the Examiner, are of record in the patented file of this patent or the original patent.

UNITED STATES PATENTS

| | | | |
|---|---|---|---|
| 3,053,454 | 9/1962 | Waterfill | 98—38 X |
| 3,122,201 | 2/1964 | Ashley et al. | 98—38 X |
| 3,223,149 | 12/1965 | Miner | 98—38 X |

ROBERT A. O'LEARY, Primary Examiner

T.W. STREULE, Assistant Examiner